United States Patent
Lu et al.

(10) Patent No.: US 11,210,131 B2
(45) Date of Patent: Dec. 28, 2021

(54) METHOD AND APPARATUS FOR ASSIGNING COMPUTING TASK

(71) Applicant: Beijing Baidu Netcom Science and Technology Co., Ltd., Beijing (CN)

(72) Inventors: Wenxiang Lu, Beijing (CN); Yuming Li, Beijing (CN); Yunlong Wang, Beijing (CN)

(73) Assignee: Beijing Baidu Netcom Science and Technology Co., Ltd., Beijing (CN)

( * ) Notice: Subject to any disclaimer, the term of this patent is extended or adjusted under 35 U.S.C. 154(b) by 133 days.

(21) Appl. No.: 16/669,134

(22) Filed: Oct. 30, 2019

(65) Prior Publication Data
US 2020/0285508 A1   Sep. 10, 2020

(30) Foreign Application Priority Data
Mar. 8, 2019   (CN) .......................... 201910175565.6

(51) Int. Cl.
G06F 9/46   (2006.01)
G06F 9/48   (2006.01)
G06F 9/50   (2006.01)

(52) U.S. Cl.
CPC .......... *G06F 9/4843* (2013.01); *G06F 9/5016* (2013.01); *G06F 9/5066* (2013.01); *G06F 9/5072* (2013.01)

(58) Field of Classification Search
CPC .... G06F 9/4843; G06F 9/5016; G06F 9/5066; G06F 9/5077
See application file for complete search history.

(56) References Cited

U.S. PATENT DOCUMENTS

| | | | |
|---|---|---|---|
| 9,128,763 B2 | 9/2015 | Sarkar et al. | |
| 2013/0080712 A1 | 3/2013 | Anand et al. | |
| 2015/0220370 A1* | 8/2015 | Ujibashi | G06F 9/5027 718/104 |
| 2016/0036886 A1* | 2/2016 | Ito | H04L 65/80 709/219 |
| 2018/0075098 A1* | 3/2018 | Yin | G06F 16/24542 |
| 2018/0260253 A1* | 9/2018 | Nanda | G06F 9/4806 |

FOREIGN PATENT DOCUMENTS

| | | |
|---|---|---|
| CN | 105718317 A | 6/2016 |
| CN | 105760227 A | 7/2016 |
| CN | 106790332 A | 5/2017 |
| CN | 107515784 A | 12/2017 |
| CN | 108469988 A | 8/2018 |
| CN | 108683738 A | 10/2018 |

* cited by examiner

*Primary Examiner* — Diem K Cao
(74) *Attorney, Agent, or Firm* — The Webb Law Firm

(57) ABSTRACT

Embodiments of the present disclosure relate to a method and apparatus for assigning a computing task. The method includes: segmenting, based on a computing resource required for a computing task of a graph, the graph into a subgraph set; determining, based on a computing resource required for a computing task of a subgraph in the subgraph set, whether a node in a node cluster is adapted to the subgraph in the subgraph set; assigning, in response to determining the node in the node cluster being adapted to the subgraph in the subgraph set, the computing task of the subgraph in the subgraph set to the node adapted to the subgraph in the subgraph set, to compute the subgraph; and synthesizing a computing result of the graph based on a computing result of each subgraph in the subgraph set.

17 Claims, 4 Drawing Sheets

METHOD AND APPARATUS FOR ASSIGNING COMPUTING TASK

CROSS-REFERENCE TO RELATED APPLICATIONS

This application claims priority to Chinese Patent Application No. 201910175565.6 filed Mar. 8, 2019, the disclosure of which is hereby incorporated by reference in its entirety.

TECHNICAL FIELD

Embodiments of the present disclosure relate to the field of computer technology, and specifically to a method and apparatus for assigning a computing task.

BACKGROUND

Graph is a most commonly used category of abstract data structure in computer science, and is more complex and has a stronger general expressing ability than linear tables and trees in terms of structure and semantics. In the context of big data at present, increasing demands for large-scale graph analysis applications are presented.

In graph computation, it is necessary to segment a large-scale graph structure into a plurality of subgraphs, and compute the subgraphs respectively. At present, most distributed cluster systems merely hand over the segmented subgraphs directly to nodes for processing. For example, computing tasks of the subgraphs are assigned to nodes in a node cluster successively in accordance with a sequence of identifiers of the nodes. After completing the assigning the computing tasks of the subgraphs, the computing tasks of the subgraphs are re-assigned in sequence, and are executed by polling. For another example, initially, all nodes in the node cluster are in an unlocked state. When the computing tasks of the subgraphs are assigned to the nodes in the node cluster, the nodes turn to a locked state, and after the computing tasks are completed, the nodes turn to an unlocked state again. Therefore, the computing tasks of the subgraphs are assigned to the nodes in the unlocked state successively. When all of the nodes in the node cluster are in the locked state, unassigned computing tasks of the subgraphs will be in a waiting state.

SUMMARY

Embodiments of the present disclosure present a method and apparatus for assigning a computing task.

In a first aspect, an embodiment of the present disclosure provides a method for assigning a computing task, including: segmenting, based on a computing resource required for a computing task of a graph, the graph into a subgraph set; determining, based on a computing resource required for a computing task of a subgraph in the subgraph set, whether a node in a node cluster is adapted to the subgraph in the subgraph set; assigning, in response to determining the node in the node cluster being adapted to the subgraph in the subgraph set, the computing task of the subgraph in the subgraph set to the node adapted to the subgraph in the subgraph set, to compute the subgraph; and synthesizing a computing result of the graph based on a computing result of each subgraph in the subgraph set.

In some embodiments, subgraphs in the subgraph set do not have a same vertex or edge with each other, and a number of computing tasks of the subgraph in the subgraph set is less than or equal to a maximum number of logical CPUs corresponding to the node cluster.

In some embodiments, a number of idle logical CPUs of the node adapted to the subgraph in the subgraph set is equal to the number of computing tasks of the subgraph in the subgraph set, and an idle memory of the node adapted to the subgraph in the subgraph set is greater than or equal to a memory required to load metadata of the subgraph in the subgraph set.

In some embodiments, the determining, based on a computing resource required for a computing task of a subgraph in the subgraph set, whether a node in a node cluster is adapted to the subgraph in the subgraph set includes: enqueuing an identifier of each subgraph in the subgraph set, to generate a subgraph queue; executing following adapting: querying, for a subgraph corresponding to a queue head element of the subgraph queue, a node resource state table based on the computing resource required for the computing task of the subgraph, and determining whether a node in the node cluster is adapted to the subgraph, where the node resource state table is configured to record a resource state of the node in the node cluster, and the resource state includes the number of idle logical CPUs and a size of the idle memory; and dequeuing the queue head element, in response to determining the node being adapted to the subgraph, and continuing to execute the adapting.

In some embodiments, the enqueuing an identifier of each subgraph in the subgraph set, to generate a subgraph queue includes: enqueuing identifiers of the subgraphs in the subgraph set successively based on priorities of the computing tasks or the number of computing tasks, to generate the subgraph queue.

In some embodiments, the method further includes: querying, in response to determining no node in the node cluster being adapted to the subgraph, the node resource state table in ascending order of the number of idle logical CPUs, and determining whether a node in the node cluster has the number of idle logical CPUs greater than the number of computing tasks of the subgraph, and the idle memory greater than or equal to the memory required to load the metadata of the subgraph, where an ascending upper limit of the number of idle logical CPUs is the maximum number of logical CPUs corresponding to the node cluster; and assigning, in response to determining the node having the number of idle logical CPUs greater than the number of computing tasks of the subgraph, and the idle memory greater than or equal to the memory required to load the metadata of the subgraph, the computing tasks of the subgraph to the node having the number of idle logical CPUs greater than the number of computing tasks of the subgraph, and the idle memory greater than or equal to the memory required to load the metadata of the subgraph, to compute the subgraph, dequeuing the queue head element, and continuing to execute the adapting.

In some embodiments, the method further includes: querying, in response to determining no node having the number of idle logical CPUs greater than the number of computing tasks of the subgraph, and the idle memory greater than or equal to the memory required to load the metadata of the subgraph, the node resource state table in descending order of the number of idle logical CPUs, and determining whether a node in the node cluster has the number of idle logical CPUs less than the number of computing tasks of the subgraph, and the idle memory greater than or equal to the memory required to load the metadata of the subgraph, where a descending lower limit of the number of idle logical CPUs is 1; and assigning, in response to determining the node having the number of idle logical CPUs less than the number of computing tasks of the subgraph, and the idle memory greater than or equal to the memory required to load the metadata of the subgraph, the computing tasks of the subgraph to the node having the number of idle logical CPUs less than the number of computing tasks of the subgraph, and the idle memory greater than or equal to the memory required to load the metadata of the subgraph, to compute the subgraph, dequeuing the queue head element, and continuing to execute the adapting.

In some embodiments, the method further includes: updating the resource state of the node in the node cluster in the node resource state table after the node in the node cluster is selected or when the computing tasks of the subgraph are completed.

In some embodiments, the method further includes: continuing to execute the adapting, in response to determining no node having the number of idle logical CPUs less than the number of computing tasks of the subgraph, and the idle memory greater than or equal to the memory required to load the metadata of the subgraph, and after updating the node resource state table.

In a second aspect, an embodiment of the present disclosure provides an apparatus for assigning a computing task, including: a segmenting unit configured to segment, based on a computing resource required for a computing task of a graph, the graph into a subgraph set; an adapting unit configured to determine, based on a computing resource required for a computing task of a subgraph in the subgraph set, whether a node in a node cluster is adapted to the subgraph in the subgraph set; a computing unit configured to assign, in response to determining the node in the node cluster being adapted to the subgraph in the subgraph set, the computing task of the subgraph in the subgraph set to the node adapted to the subgraph in the subgraph set, to compute the subgraph; and a synthesizing unit configured to synthesize a computing result of the graph based on a computing result of each subgraph in the subgraph set.

In some embodiments, subgraphs in the subgraph set do not have a same vertex or edge with each other, and a number of computing tasks of the subgraph in the subgraph set is less than or equal to a maximum number of logical CPUs corresponding to the node cluster.

In some embodiments, a number of idle logical CPUs of the node adapted to the subgraph in the subgraph set is equal to the number of computing tasks of the subgraph in the subgraph set, and an idle memory of the node adapted to the subgraph in the subgraph set is greater than or equal to a memory required to load metadata of the subgraph in the subgraph set.

In some embodiments, the adapting unit includes: a generating subunit configured to enqueue an identifier of each subgraph in the subgraph set, to generate a subgraph queue; an adapting subunit configured to execute following adapting: querying, for a subgraph corresponding to a queue head element of the subgraph queue, a node resource state table based on the computing resource required for the computing task of the subgraph, and determining whether a node in the node cluster is adapted to the subgraph, where the node resource state table is configured to record a resource state of the node in the node cluster, and the resource state includes the number of idle logical CPUs and a size of the idle memory; and an executing subunit configured to dequeue the queue head element, in response to determining the node being adapted to the subgraph, and continue to execute the adapting.

In some embodiments, the generating subunit is further configured to: enqueue identifiers of the subgraphs in the subgraph set successively based on priorities of the computing tasks or the number of computing tasks, to generate the subgraph queue.

In some embodiments, the adapting subunit is further configured to: query, in response to determining no node in the node cluster being adapted to the subgraph, the node resource state table in ascending order of the number of idle logical CPUs, and determine whether a node in the node cluster has the number of idle logical CPUs greater than the number of computing tasks of the subgraph, and the idle memory greater than or equal to the memory required to load the metadata of the subgraph, where an ascending upper limit of the number of idle logical CPUs is the maximum number of logical CPUs corresponding to the node cluster; and assign, in response to determining the node having the number of idle logical CPUs greater than the number of computing tasks of the subgraph, and the idle memory greater than or equal to the memory required to load the metadata of the subgraph, the computing tasks of the subgraph to the node having the number of idle logical CPUs greater than the number of computing tasks of the subgraph, and the idle memory greater than or equal to the memory required to load the metadata of the subgraph, to compute the subgraph, dequeue the queue head element, and continue to execute the adapting.

In some embodiments, the adapting subunit is further configured to: query, in response to determining no node having the number of idle logical CPUs greater than the number of computing tasks of the subgraph, and the idle memory greater than or equal to the memory required to load the metadata of the subgraph, the node resource state table in descending order of the number of idle logical CPUs, and determine whether a node in the node cluster has the number of idle logical CPUs less than the number of computing tasks of the subgraph, and the idle memory greater than or equal to the memory required to load the metadata of the subgraph, where a descending lower limit of the number of idle logical CPUs is 1; and assign, in response to determining the node having the number of idle logical CPUs less than the number of computing tasks of the subgraph, and the idle memory greater than or equal to the memory required to load the metadata of the subgraph, the computing tasks of the subgraph to the node having the number of idle logical CPUs less than the number of computing tasks of the subgraph, and the idle memory greater than or equal to the memory required to load the metadata of the subgraph, to compute the subgraph, dequeue the queue head element, and continue to execute the adapting.

In some embodiments, the apparatus further includes: an updating unit configured to update the resource state of the node in the node cluster in the node resource state table after the node in the node cluster is selected or when the computing tasks of the subgraph are completed.

In some embodiments, the adapting subunit is further configured to: continue to execute the adapting, in response to determining no node having the number of idle logical CPUs less than the number of computing tasks of the subgraph, and the idle memory greater than or equal to the memory required to load the metadata of the subgraph, and after updating the node resource state table.

In a third aspect, an embodiment of the present disclosure provides a server, including: one or more processors; and a storage apparatus, configured to store one or more programs, where the one or more programs, when executed by the one or more processors, cause the one or more processors to implement the method according to any one implementation in the first aspect.

In a fourth aspect, an embodiment of the present disclosure provides a computer readable medium, storing a computer program thereon, where the computer program, when executed by a processor, implements the method according to any one implementation in the first aspect.

The method and apparatus for assigning a computing task provided by some embodiments of the present disclosure first segment, based on a computing resource required for a computing task of a graph, the graph into a subgraph set; then determine, based on a computing resource required for a computing task of a subgraph in the subgraph set, whether a node in a node cluster is adapted to the subgraph in the subgraph set; assign, when determining the node in the node cluster being adapted to the subgraph in the subgraph set, the computing task of the subgraph in the subgraph set to the node adapted to the subgraph in the subgraph set, to compute the subgraph; and finally synthesize a computing result of the graph based on a computing result of each subgraph in the subgraph set. The computing task of the subgraph in the subgraph set is executed using the node adapted to the subgraph in the subgraph set in the node cluster, thereby improving the utilization rate of idle resources in the node cluster, and further enhancing the computing efficiency of the graph.

BRIEF DESCRIPTION OF THE DRAWINGS

After reading detailed description of non-limiting embodiments with reference to the following accompanying drawings, other features, objectives and advantages of the present disclosure will become more apparent.

DETAILED DESCRIPTION OF EMBODIMENTS

Embodiments of present disclosure will be described below in detail with reference to the accompanying drawings. It should be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should also be noted that some embodiments in the present disclosure and some features in the disclosure may be combined with each other on a non-conflict basis. Features of the present disclosure will be described below in detail with reference to the accompanying drawings and in combination with embodiments.

Figure 1:
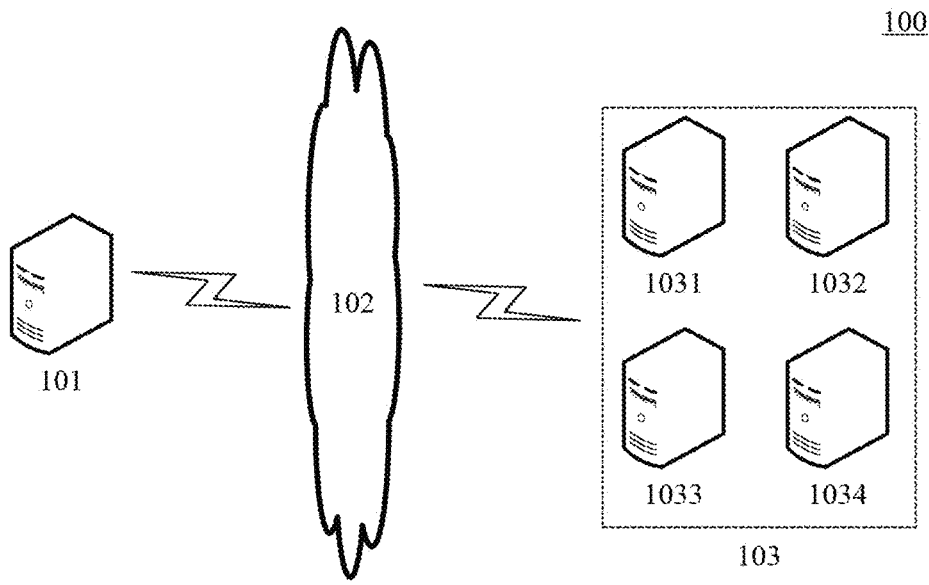
FIG. 1 is a diagram of an example system architecture in which an embodiment of the present disclosure may be implemented.

FIG. 1 shows an example system architecture 100 in which a method for assigning a computing task or an apparatus for assigning a computing task according to an embodiment of the present disclosure may be implemented.

As shown in FIG. 1, the system architecture 100 may include a server 101, a network 102, and a node cluster 103. The node cluster 103 may include nodes 1031, 1032, 1033, and 1034. The network 102 serves as a medium providing a communication link between the server 101 and the node cluster 103. The network 102 may include various types of connections, such as wired or wireless communication links, or optical cables.

The server 101 may interact with the node cluster 103 via the network 102, for example, to receive or transmit a message. The server 101 may segment a graph into a subgraph set, and assign a computing task of the subgraph set to the node cluster 103, to compute the graph. The node cluster 103 may transmit a computing result of each subgraph in the subgraph set to the server 101, such that the server 101 synthesizes a computing result of the graph.

It should be noted that the server 101 may be hardware or software. When the server 101 is hardware, the server may be implemented as a distributed server cluster including a plurality of servers, or be implemented as a single server. When the server 101 is software, the server may be implemented as a plurality of software programs or software modules (e.g., software programs or software modules for providing distributed services), or be implemented as a single software program or software module. This is not specifically limited here.

It should be noted that the method for assigning a computing task provided by some embodiments of the present disclosure is generally executed by the server 101. Accordingly, the apparatus for assigning a computing task is generally provided in the server 101.

It should be understood that the numbers of servers, networks, and node clusters, as well as nodes in each of the node clusters, in FIG. 1 are merely illustrative. Any number of servers, networks, and node clusters, as well as nodes in each of the node clusters, may be provided based on actual requirements.

Figure 2:
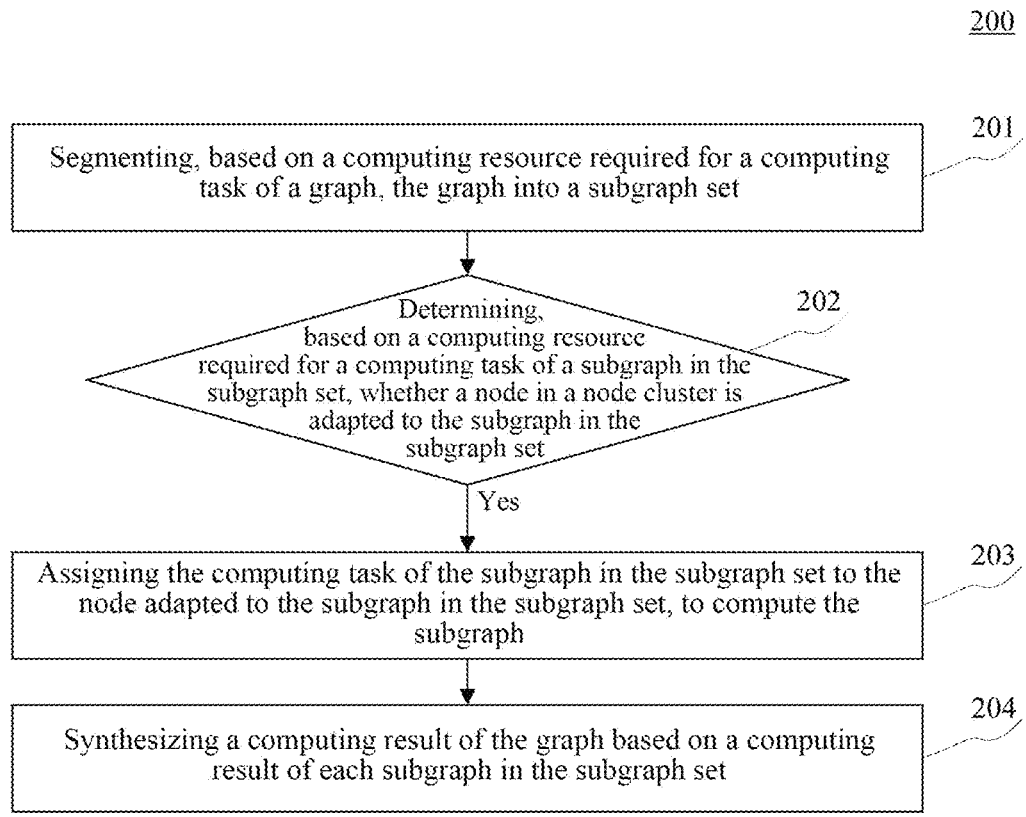
FIG. 2 is a flowchart of a method for assigning a computing task according to an embodiment of the present disclosure.

Further referring to FIG. 2, a process 200 of a method for assigning a computing task according to an embodiment of the present disclosure is shown. The method for assigning a computing task is applied to a database server for assigning a computing task, and includes the following steps.

Step 201: segmenting, based on a computing resource required for a computing task of a graph, the graph into a subgraph set.

In the present embodiment, an executing body (e.g., the server 101 shown in FIG. 1) of the method for assigning a computing task may segment the graph based on the computing resource required for the computing task of the graph, to obtain the subgraph set.

In practice, the graph may be structural data of vertices and edges between the vertices obtained by abstractly expressing things in nature and relationships between the things respectively. For example, for the Internet, a page may be regarded as a vertex, and a hyperlink relationship between pages may be regarded as an edge. For another example, for a social network, a user may be regarded as a vertex, a relationship established between users may be regarded as an edge, and a category of the relationship may be regarded as a weight. For still another example, for a large-scale e-store, a user and a commodity may be regarded as vertices, a purchase relationship between the user and the commodity may be regarded as an edge, and the number of times of purchases may be regarded as a weight.

Specifically, the graph may consist of a finite nonempty set of vertices and a set of edges between the vertices, and is denoted as G(V, E). G denotes a graph, V is a set of vertices in the graph G, and E is a set of edges in the graph G. Based on whether E is directed, the graph may be categorized as a directed graph or an undirected graph. Based on whether E is weighted, the graph may be categorized as a weighted graph or a non-weighted graph.

Here, the computing task may be a computing task thread. The computing resource required for the computing task may be a logical CPU (Central Processing Unit) and a memory required to execute the computing task thread.

Generally, it is necessary to segment a large-scale graph structure into a subgraph set, and then distribute subgraphs to a node cluster, to compute the graph. The computing the graph means that to-be-computed data are derived from the graph, but the computing type is not limited and may include graph computation.

Alternatively, the subgraphs in the subgraph set are independent of each other. That is, any two subgraphs in the subgraph set do not have a same vertex or edge with each other. Thus, it can be ensured that computing resources required for the computing task of the subgraph are all stored in the subgraph, and no other computing resources except for the subgraph are required.

In some alternative implementations of the present embodiment, the subgraph set may meet the following conditions: first, the subgraphs in the subgraph set do not have the same vertex or edge with each other; and second, the number of computing tasks of each of the subgraphs in the subgraph set is less than or equal to the maximum number of logical CPUs corresponding to the node cluster. Generally, at the same moment, one logical CPU can merely process one computing task, and the number of computing tasks of the subgraph is less than or equal to the maximum number of logical CPUs corresponding to the node cluster, such that all computing tasks of the subgraph can be executed by a node at the same moment as far as possible, thereby enhancing the computing efficiency of the graph. The number of logical CPUs of the node is equal to a product of the number of physical CPUs of the node, the number of cores of the physical CPUs, and the number of hyperthreads. The maximum number of logical CPUs corresponding to the node cluster may be the maximum number of logical CPUs of nodes in the node cluster.

In addition, each subgraph in the subgraph set stores information of vertices and edges thereon, total storage size of the subgraph, and a computing task sequence.

Step 202: determining, based on a computing resource required for a computing task of a subgraph in the subgraph set, whether a node in a node cluster is adapted to the subgraph in the subgraph set.

In the present embodiment, for each subgraph in the subgraph set, the executing body may determine whether the node (e.g., the node 1031, 1032, 1033, or 1034 shown in FIG. 1) in the node cluster (e.g., the node cluster 103 shown in FIG. 1) is adapted to the subgraph based on the computing resource required for the computing task of the subgraph. In the case where the node in the node cluster is adapted to the subgraph in the subgraph set, step 203 is executed. The node adapted to the subgraph may be a node capable of executing all computing tasks of the subgraph.

In some alternative implementations of the present embodiment, the node adapted to the subgraph in the subgraph set can meet the following conditions: first, the number of idle logical CPUs of the node adapted to the subgraph in the subgraph set is equal to the number of computing tasks of the subgraph in the subgraph set; and second, an idle memory of the node adapted to the subgraph in the subgraph set is greater than or equal to a memory required to load metadata of the subgraph in the subgraph set. Thus, the node adapted to the subgraph can not only execute all computing tasks of the subgraph at a same moment, but also fully utilize the idle logical CPUs and the idle memory, to improve the utilization rate of idle resources of the node in the node cluster. Generally, an idle logical CPU may be a logical CPU in an unoccupied state. The metadata of the subgraph may be an address of information stored in the vertices and the edges of the subgraph.

Step 203: assigning the computing task of the subgraph in the subgraph set to the node adapted to the subgraph in the subgraph set, to compute the subgraph.

In the present embodiment, for each subgraph in the subgraph set, in the case where the node in the node cluster is adapted to the subgraph, the executing body may assign the computing task of the subgraph to the node adapted to the subgraph, to compute the subgraph, and then obtain a computing result of the subgraph. Generally, the node adapted to the subgraph can load the metadata of the subgraph into its memory, and execute the computing task of the subgraph using the idle logical CPU.

Step 204: synthesizing a computing result of the graph based on a computing result of each subgraph in the subgraph set.

In the present embodiment, for each subgraph in the subgraph set, the node adapted to the subgraph can transmit the computing result of the subgraph to the executing body. Thus, the executing body can synthesize the computing result of the graph based on the computing result of each subgraph in the subgraph set.

The method for assigning a computing task provided by some embodiments of the present disclosure first segments, based on a computing resource required for a computing task of a graph, the graph into a subgraph set; then determines, based on a computing resource required for a computing task of a subgraph in the subgraph set, whether a node in a node cluster is adapted to the subgraph in the subgraph set; assigns, in response to determining the node in the node cluster being adapted to the subgraph in the subgraph set, the computing task of the subgraph in the subgraph set to the node adapted to the subgraph in the subgraph set, to compute the subgraph; and finally synthesizes a computing result of the graph based on a computing result of each subgraph in the subgraph set. The computing task of the subgraph in the subgraph set is executed using the node adapted to the subgraph in the subgraph set in the node cluster, thereby improving the utilization rate of idle resources in the node cluster, and further enhancing the computing efficiency of the graph.

Figure 3:
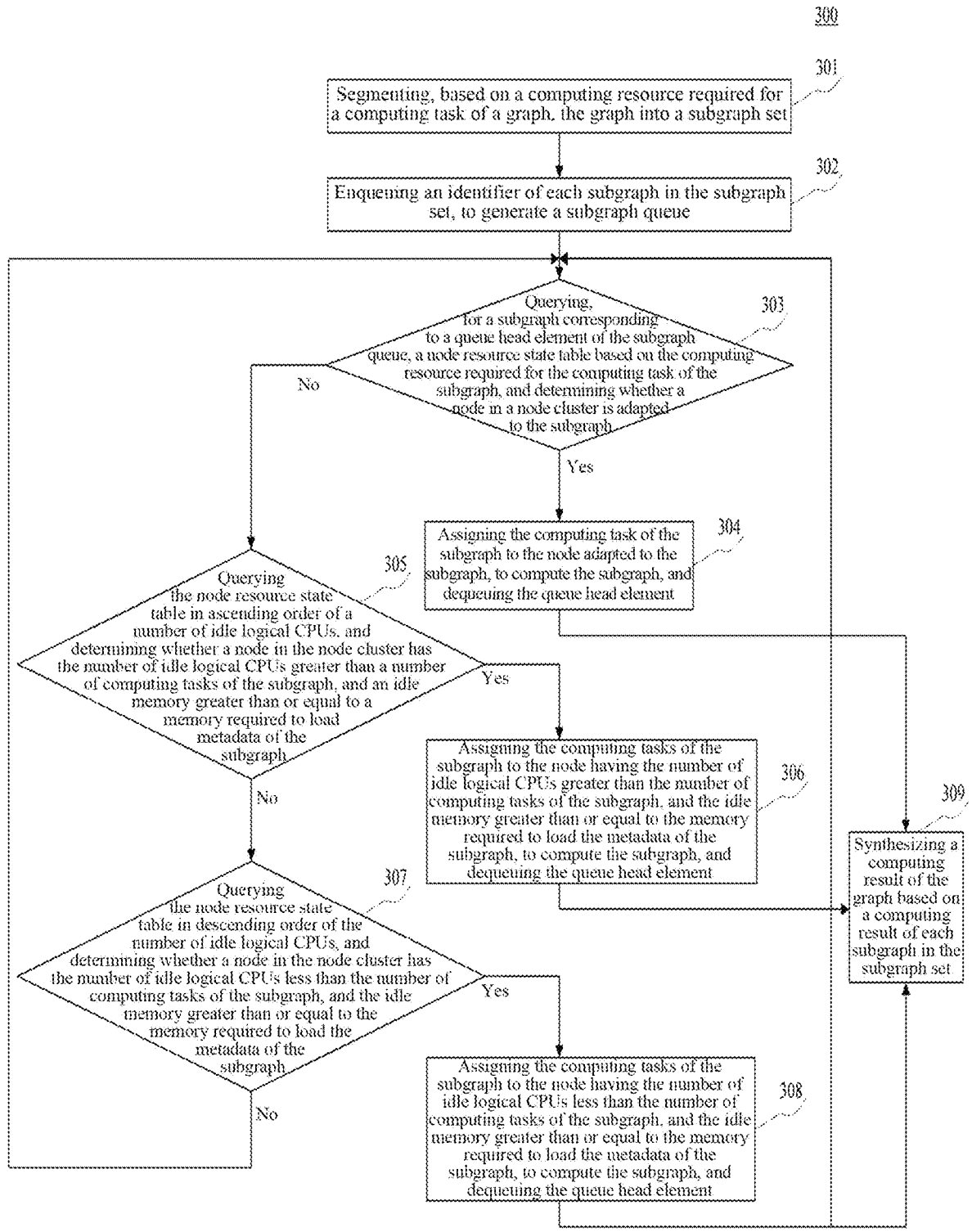
FIG. 3 is a flowchart of the method for assigning a computing task according to another embodiment of the present disclosure.

Further referring to FIG. 3, a process 300 of the method for assigning a computing task according to another embodiment of the present disclosure is shown. The method for assigning a computing task is applied to a server for assigning a computing task, and includes the following steps.

Step 301: segmenting, based on a computing resource required for a computing task of a graph, the graph into a subgraph set.

In the present embodiment, specific operations in step 301 have been introduced in detail in step 201 in the embodiment shown in FIG. 2. The description will not be repeated here.

Step 302: enqueuing an identifier of each subgraph in the subgraph set, to generate a subgraph queue.

In the present embodiment, an executing body (e.g., the server 101 shown in FIG. 1) of the method for assigning a computing task may enqueue the identifier of each subgraph in the subgraph set, to generate the subgraph queue. Specifically, the executing body may first set an empty queue, and then insert an identifier of each subgraph in the subgraph set into the queue successively from the rear of the queue. When identifiers of all subgraphs in the subgraph set are completely enqueued, the subgraph queue is generated.

In some alternative implementations of the present embodiment, the executing body can enqueue the identifiers of the subgraphs in the subgraph set successively based on priorities of the computing tasks or the number of computing tasks, to generate the subgraph queue. For example, the executing body can enqueue the identifiers of the subgraphs in the subgraph set successively based on the priorities of the computing tasks in descending order, to generate the subgraph queue. Thus, the executing body can preferentially adapt a node to a subgraph with a computing task of a high priority. For another example, the executing body can enqueue the identifiers of the subgraphs in the subgraph set successively based on the number of computing tasks in descending order, to generate the subgraph queue. Thus, the executing body can preferentially adapt a node to a subgraph with a large number of computing tasks.

Step 303: querying, for a subgraph corresponding to a queue head element of the subgraph queue, a node resource state table based on the computing resource required for the computing task of the subgraph, and determining whether a node in a node cluster is adapted to the subgraph.

In the present embodiment, for the subgraph corresponding to the queue head element of the subgraph queue, the executing body can query the node resource state table based on the computing resource required for the computing task of the subgraph, and determine whether the node in the node cluster is adapted to the subgraph. In the case where the node is adapted to the subgraph, step 304 is executed; while in the case where no node is adapted to the subgraph, step 305 is executed. The node resource state table can be used for recording a resource state of each node in the node cluster. The resource state includes a number of idle logical CPUs and a size of an idle memory.

Specifically, the executing body can query the node resource state table based on the number of computing tasks of the subgraph, and determine whether a node in the node cluster has the number of idle logical CPUs equal to the number of computing tasks of the subgraph; and determine, if the node in the node cluster has the number of idle logical CPUs equal to the number of computing tasks of the subgraph, whether an idle memory of the node having the number of idle logical CPUs equal to the number of computing tasks of the subgraph is greater than or equal to a memory required to load metadata of the subgraph; and determine, if the idle memory of the node having the number of idle logical CPUs equal to the number of computing tasks of the subgraph is greater than or equal to the memory required to load the metadata of the subgraph, the node in the node cluster is adapted to the subgraph. The node having the number of idle logical CPUs equal to the number of computing tasks of the subgraph, and the idle memory greater than or equal to the memory required to load the metadata of the subgraph is the node adapted to the subgraph.

Step 304: assigning the computing task of the subgraph to the node adapted to the subgraph, to compute the subgraph, and dequeuing the queue head element.

In the present embodiment, in the case where the node is adapted to the subgraph, the executing body may assign the computing task of the subgraph to the node adapted to the subgraph, to compute the subgraph, dequeue the queue head element, and continue to execute step 303.

In some alternative implementations of the present embodiment, the executing body can update the resource state of the node in the node cluster in the node resource state table after the node in the node cluster is selected. That is, in the case where the node is adapted to the subgraph, the executing body can further simultaneously update the resource state of the node adapted to the subgraph in the node resource state table. Specifically, in a process of computing the subgraph, it is necessary to occupy not only a memory of the node adapted to the subgraph to load the metadata of the subgraph, but also a logical CPU of the node adapted to the subgraph to execute the computing task of the subgraph. Therefore, the executing body can subtract a number of occupied logical CPUs from an original number of idle logical CPUs of the node adapted to the subgraph, to obtain a current number of idle logical CPUs. Similarly, the executing body may subtract a size of the occupied memory of the node adapted to the subgraph from an original size of the idle memory of the node adapted to the subgraph, to obtain a current size of the idle memory. Then, the executing body updates the resource state of the node adapted to the subgraph in the node resource state table based on the current number of idle logical CPUs and the current size of the idle memory.

It should be noted that the assigning the computing task, the updating the node resource state table, and the dequeuing the queue head element can be processed in parallel. In addition, after the dequeuing the queue head element, a queue element next to the queue head element becomes a new queue head element. In this case, step 303 may be returned to continue to execute the adapting until all queue elements in all subgraph queues are completely dequeued.

Step 305: querying the node resource state table in ascending order of a number of idle logical CPUs, and determining whether a node in the node cluster has the number of idle logical CPUs greater than a number of computing tasks of the subgraph, and an idle memory greater than or equal to a memory required to load metadata of the subgraph.

In the present embodiment, in the case of where no node in the node cluster is adapted to the subgraph, the executing body can query the node resource state table in ascending order of the number of idle logical CPUs, and determine whether a node in the node cluster has the number of idle logical CPUs greater than the number of computing tasks of the subgraph, and the idle memory greater than or equal to the memory required to load the metadata of the subgraph. In the case where the node in the node cluster has the number of idle logical CPUs greater than the number of computing tasks of the subgraph, and the idle memory greater than or equal to the memory required to load the metadata of the subgraph, step 306 is executed; or otherwise, step 307 is executed. Here, an ascending upper limit of the number of idle logical CPUs may be a maximum number of logical CPUs corresponding to the node cluster.

For example, the number of computing tasks of the subgraph is 5, and if no node in the node cluster just has 5 idle logical CPUs, then whether a node in the node cluster has 6 idle logical CPUs is first determined in ascending order of the number of idle logical CPUs. If no node has 6 idle logical CPUs, or if the node has 6 idle logical CPUs but an idle memory of the node having 6 idle logical CPUs is less than the memory required to load the metadata of the subgraph, then whether a node in the node cluster has 7 idle logical CPUs is determined in ascending order of the number of idle logical CPUs, and so on, until determining the node having the number of idle logical CPUs greater than the number of computing tasks of the subgraph, and the idle memory greater than or equal to the memory required to load the metadata of the subgraph, or the number of idle logical CPUs ascending to the ascending upper limit of the number of idle logical CPUs.

Step 306: assigning the computing tasks of the subgraph to the node having the number of idle logical CPUs greater than the number of computing tasks of the subgraph, and the idle memory greater than or equal to the memory required to load the metadata of the subgraph, to compute the subgraph, and dequeuing the queue head element.

In the present embodiment, in the case where a node has the number of idle logical CPUs greater than the number of computing tasks of the subgraph, and the idle memory greater than or equal to the memory required to load the metadata of the subgraph, the executing body can assign the computing tasks of the subgraph to the node having the number of idle logical CPUs greater than the number of computing tasks of the subgraph, and the idle memory greater than or equal to the memory required to load the metadata of the subgraph, to compute the subgraph, dequeue the queue head element, and continue to execute step 303.

In some alternative implementations of the present embodiment, the executing body can update the resource state of the node in the node cluster in the node resource state table after the node in the node cluster is selected. That is, in the case where the node has the number of idle logical CPUs greater than the number of computing tasks of the subgraph, and the idle memory greater than or equal to the memory required to load the metadata of the subgraph, the executing body can further simultaneously update the resource state of the node having the number of idle logical CPUs greater than the number of computing tasks of the subgraph, and the idle memory greater than or equal to the memory required to load the metadata of the subgraph in the node resource state table.

Step 307: querying the node resource state table in descending order of the number of idle logical CPUs, and determining whether a node in the node cluster has the number of idle logical CPUs less than the number of computing tasks of the subgraph, and the idle memory greater than or equal to the memory required to load the metadata of the subgraph.

In the present embodiment, in the case where no node has the number of idle logical CPUs greater than the number of computing tasks of the subgraph, and the idle memory greater than or equal to the memory required to load the metadata of the subgraph, the executing body can query the node resource state table in descending order of the number of idle logical CPUs, and determine whether a node in the node cluster has the number of idle logical CPUs less than the number of computing tasks of the subgraph, and the idle memory greater than or equal to the memory required to load the metadata of the subgraph. In the case where the node has the number of idle logical CPUs less than the number of computing tasks of the subgraph, and the idle memory greater than or equal to the memory required to load the metadata of the subgraph, step 308 is executed; or otherwise, step 303 is further executed. Here, a descending lower limit of the number of idle logical CPUs is 1.

For example, the number of computing tasks of the subgraph is 5, and if no node in the node cluster just has the number of idle logical CPUs greater than or equal to 5, then whether a node in the node cluster has 4 idle logical CPUs is first determined in descending order of the number of idle logical CPUs. If no node has 4 idle logical CPUs, or the node has 4 idle logical CPUs, but an idle memory of the node having 4 idle logical CPUs is less than the memory required to load the metadata of the subgraph, then whether a node in the node cluster has 3 idle logical CPUs is determined in descending order of the number of idle logical CPUs, and so on, until determining the node having the number of idle logical CPUs less than the number of computing tasks of the subgraph, and the idle memory greater than or equal to the memory required to load the metadata of the subgraph, or the number of idle logical CPUs descending to the descending lower limit of idle logical CPUs.

Step 308: assigning the computing tasks of the subgraph to the node having the number of idle logical CPUs less than the number of computing tasks of the subgraph, and the idle memory greater than or equal to the memory required to load the metadata of the subgraph, to compute the subgraph, and dequeuing the queue head element.

In the present embodiment, in the case where the number of idle logical CPUs is less than the number of computing tasks of the subgraph, and the idle memory is greater than or equal to the memory required to load the metadata of the subgraph, the executing body can assign the computing tasks of the subgraph to the node having the number of idle logical CPUs less than the number of computing tasks of the subgraph, and the idle memory greater than or equal to the memory required to load the metadata of the subgraph, to compute the subgraph, dequeue the queue head element, and continue to execute step 303.

In some alternative implementations of the present embodiment, the executing body can update the resource state of the node in the node cluster in the node resource state table after the node in the node cluster is selected. That is, in the case where the node has the number of idle logical CPUs less than the number of computing tasks of the subgraph, and the idle memory greater than or equal to the memory required to load the metadata of the subgraph, the executing body can further simultaneously update the resource state of the node having the number of idle logical CPUs less than the number of computing tasks of the subgraph, and the idle memory greater than or equal to the memory required to load the metadata of the subgraph in the node resource state table.

It should be noted that when executing the computing tasks of the subgraph, the node having the number of idle logical CPUs less than the number of computing tasks of the subgraph first assigns one computing task to each of the idle logical CPUs to compute the computing task. Unassigned computing tasks are in a waiting state, and after the assigned computing tasks are completed, then the unassigned computing tasks are assigned to released logical CPUs for computation.

In some alternative implementations of the present embodiment, when the computing tasks of the subgraph are completed, the executing body can update the resource state of the node in the node cluster in the node resource state table. That is, when the computing tasks of the subgraph are completed, the executing body can further simultaneously update the resource state of the node executing the computing tasks of the subgraph in the node resource state table. Specifically, when the computing tasks are completed, it is necessary to release not only a memory occupied to load the metadata of the subgraph, but also logical CPUs occupied to execute the computing tasks of the subgraph. Therefore, the executing body can add a number of released logical CPUs to an original number of idle logical CPUs of the node executing the computing tasks of the subgraph, to obtain a current number of idle logical CPUs. Similarly, the executing body can add a size of the released memory of the node executing the computing tasks of the subgraph to an original size of the idle memory of the node executing the computing tasks of the subgraph, to obtain a current size of the idle memory. Then, the executing body updates the resource state of the node executing the computing tasks of the subgraph in the node resource state table based on the current number of idle logical CPUs and the current size of the idle memory.

In some alternative implementations of the present embodiment, in the case where no node has the number of idle logical CPUs less than the number of computing tasks of the subgraph, and the idle memory greater than or equal to the memory required to load the metadata of the subgraph, the executing body can continue to execute step 303 after updating the node resource state table.

Step 309: synthesizing a computing result of the graph based on a computing result of each subgraph in the subgraph set.

In the present embodiment, specific operations in step 309 have been introduced in detail in step 204 in the embodiment shown in FIG. 2. The description will not be repeated here.

Figure 4:
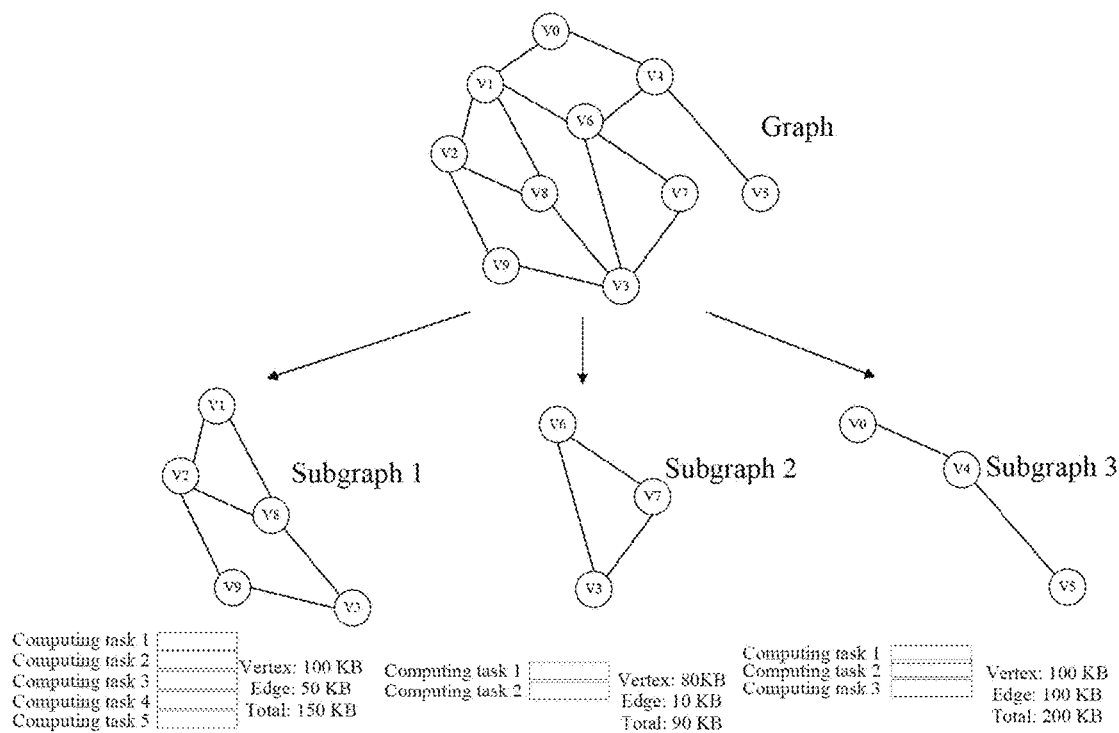
FIG. 4 is a schematic diagram of an application scenario of the method for assigning a computing task shown in FIG. 3.
Figure 4:
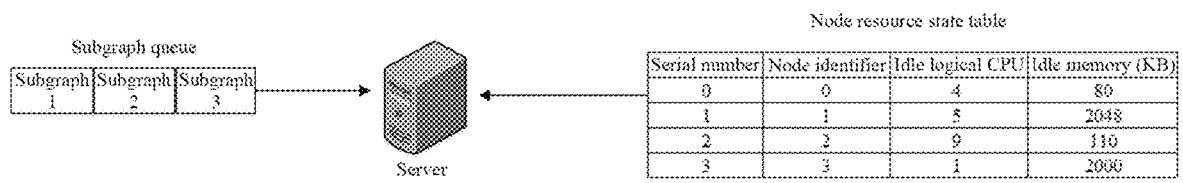
Figure 4:
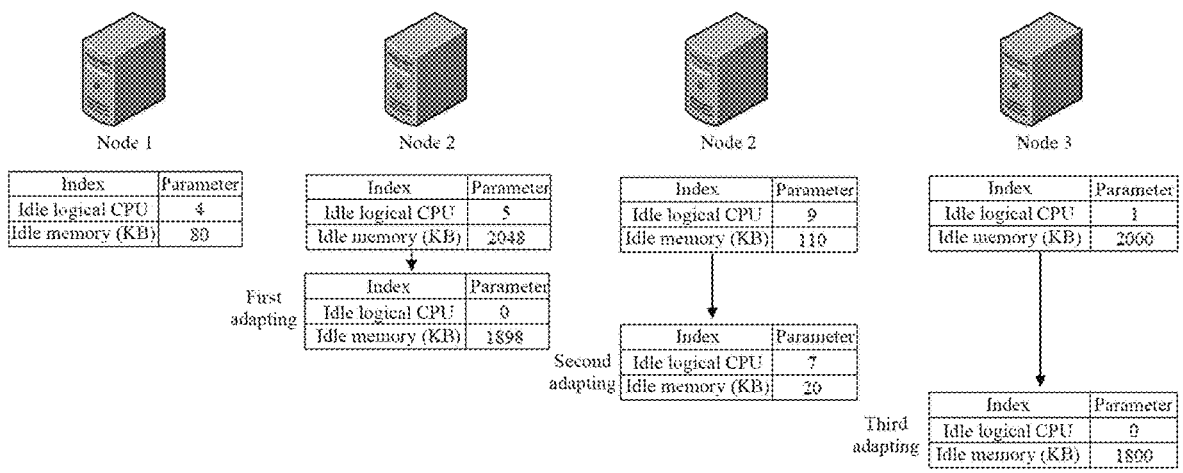

Further referring to FIG. 4, FIG. 4 is a schematic diagram of an application scenario of the method for assigning a computing task shown in FIG. 3. In the application scenario shown in FIG. 4, a node cluster includes a node 0, a node 1, a node 2, and a node 3. The number of idle logical CPUs of the node 0 is 4, and the idle memory of the node 0 is 80 KB. The number of idle logical CPUs of the node 1 is 5, and the idle memory of the node 1 is 2048 K B. The number of idle logical CPUs of the node 2 is 9, and the idle memory of the node 2 is 110 KB. The number of idle logical CPUs of the node 3 is 1, and the idle memory of the node 3 is 2000 KB. In this case, a node resource state table is generated to record a resource state of each node in the node cluster. A graph is segmented into a subgraph set, including a subgraph 1, a subgraph 2, and a subgraph 3. The subgraph 1 includes 5 computing tasks, and needs a memory of 150 KB. The subgraph 2 includes 2 computing tasks, and needs a memory of 90 KB. The subgraph 3 includes 3 computing tasks, and needs a memory of 200 KB. In this case, an identifier of each of the subgraphs in the subgraph set is enqueued, to generate a subgraph queue. Since a queue head element of the subgraph queue corresponds to the subgraph 1, a server queries the node resource state table, and determines that the node 1 just has 5 idle logical CPUs, and the idle memory of the node 1 is greater than or equal to 150 KB, i.e., the subgraph 1 is adapted to the node 1. In this case, the server assigns the computing tasks of the subgraph 1 to the node 1, to compute the subgraph, updates the resource state of the node 1 in the node resource state table, and dequeues the identifier of the subgraph 1. Then, the subgraph 2 becomes a new queue head element. The server queries the node resource state table, and determines that no node has 2 idle logical CPUs. In this case, the server queries the node resource state table in ascending order of the number of idle logical CPUs, first determines that the node 0 has 4 idle logical CPUs, but the idle memory is less than 90 KB, and then determines that the node 2 has 9 idle logical CPUs, and the idle memory is greater than or equal to 90 KB. In this case, the server assigns the computing tasks of the subgraph 2 to the node 2, to compute the subgraph, updates the resource state of the node 2 in the node resource state table, and dequeues the identifier of the subgraph 2. Then, the subgraph 3 becomes a new queue head element. The server queries the node resource state table, and determines that no node has 3 idle logical CPUs. In this case, the server first queries the node resource state table in ascending order of the number of idle logical CPUs, and determines that the node 0 has 4 idle logical CPUs, but the idle memory is less than 200 KB; then queries the node resource state table in descending order of the number of idle logical CPUs, and determines that the node 2 has 2 idle logical CPUs, but the idle memory is less than 200 KB; and then queries the node resource state table in descending order of the number of idle logical CPUs, and determines that the node 3 has 1 idle logical CPU, but the idle memory is greater than or equal to 200 KB. In this case, the server assigns the computing tasks of the subgraph 3 to the node 3, to compute the subgraph, updates the resource state of the node 3 in the node resource state table, and dequeues the identifier of the subgraph 3. When completing the computing tasks of any one subgraph of the subgraph 1, the subgraph 2, and the subgraph 3, the server re-updates the resource state of the node in the node resource state table. Finally, the server synthesizes a computing result of the graph based on computing results of the subgraph 1, the subgraph 2, and the subgraph 3.

As can be seen from FIG. 3, compared with the corresponding embodiment of FIG. 2, the process 300 of the method for assigning a computing task in the present embodiment highlights the adapting. Accordingly, the scheme described in the present embodiment repeatedly queries the node resource state table based on the computing resource required for the computing task of the subgraph, to determine a node for executing the computing task of the subgraph, thereby fully utilizing the idle logical CPUs and idle memory of the node in the node cluster, further improving the utilization rate of idle resources in the node cluster, and then enhancing the computing efficiency of the graph.

Figure 5:
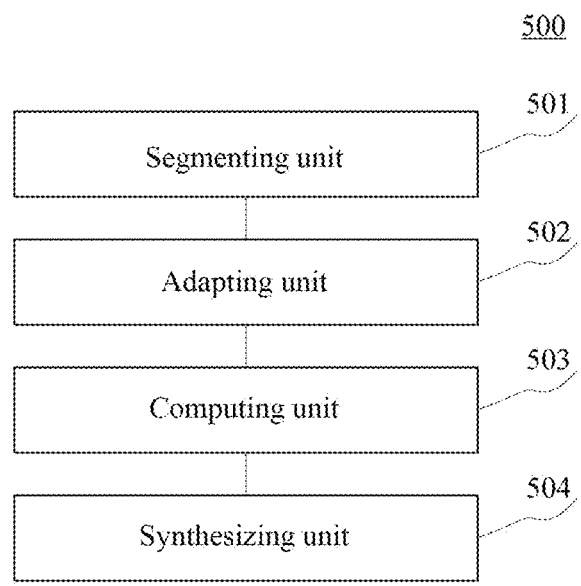
FIG. 5 is a schematic structural diagram of an apparatus for assigning a computing task according to an embodiment of the present disclosure.

Further referring to FIG. 5, as an implementation of the method shown in the above figures, an embodiment of the present disclosure provides an apparatus for assigning a computing task. An embodiment of the apparatus may correspond to the embodiment of the method shown in FIG. 2, and the apparatus may be specifically applied to various electronic devices.

As shown in FIG. 5, the apparatus 500 for assigning a computing task in the present embodiment may include: a segmenting unit 501, an adapting unit 502, a computing unit 503, and a synthesizing unit 504. The segmenting unit 501 is configured to segment, based on a computing resource required for a computing task of a graph, the graph into a subgraph set; the adapting unit 502 is configured to determine, based on a computing resource required for a computing task of a subgraph in the subgraph set, whether a node in a node cluster is adapted to the subgraph in the subgraph set; the computing unit 503 is configured to assign, in response to determining the node in the node cluster being adapted to the subgraph in the subgraph set, the computing task of the subgraph in the subgraph set to the node adapted to the subgraph in the subgraph set, to compute the subgraph; and the synthesizing unit 504 is configured to synthesize a computing result of the graph based on a computing result of each subgraph in the subgraph set.

The related description of step 201, step 202, step 203, and step 204 in the corresponding embodiment of FIG. 2 may be referred to for specific processing of the segmenting unit 501, the adapting unit 502, the computing unit 503, and the synthesizing unit 504 of the apparatus 500 for assigning a computing task and the technical effects thereof in the present embodiment, respectively. The description will not be repeated here.

In some alternative implementations of the present embodiment, subgraphs in the subgraph set do not have a same vertex or edge with each other, and a number of computing tasks of the subgraph in the subgraph set is less than or equal to a maximum number of logical CPUs corresponding to the node cluster.

In some alternative implementations of the present embodiment, a number of idle logical CPUs of the node adapted to the subgraph in the subgraph set is equal to the number of computing tasks of the subgraph in the subgraph set, and an idle memory of the node adapted to the subgraph in the subgraph set is greater than or equal to a memory required to load metadata of the subgraph in the subgraph set.

In some alternative implementations of the present embodiment, the adapting unit 502 includes: a generating subunit (not shown in the figure) configured to enqueue an identifier of each subgraph in the subgraph set, to generate a subgraph queue; an adapting subunit (not shown in the figure) configured to execute following adapting: querying, for a subgraph corresponding to a queue head element of the subgraph queue, a node resource state table based on the computing resource required for the computing task of the subgraph, and determining whether a node in the node cluster is adapted to the subgraph, where the node resource state table is configured to record a resource state of the node in the node cluster, and the resource state includes the number of idle logical CPUs and a size of the idle memory; and an executing subunit (not shown in the figure) configured to dequeue the queue head element, in response to determining the node being adapted to the subgraph, and continue to execute the adapting.

In some alternative implementations of the present embodiment, the generating subunit is further configured to: enqueue identifiers of the subgraphs in the subgraph set successively based on priorities of the computing tasks or the number of computing tasks, to generate the subgraph queue.

In some alternative implementations of the present embodiment, the adapting subunit is further configured to: query, in response to determining no node in the node cluster being adapted to the subgraph, the node resource state table in ascending order of the number of idle logical CPUs, and determine whether a node in the node cluster has the number of idle logical CPUs greater than the number of computing tasks of the subgraph, and the idle memory greater than or equal to the memory required to load the metadata of the subgraph, where an ascending upper limit of the number of idle logical CPUs is the maximum number of logical CPUs corresponding to the node cluster; and assign, in response to determining the node having the number of idle logical CPUs greater than the number of computing tasks of the subgraph, and the idle memory greater than or equal to the memory required to load the metadata of the subgraph, the computing tasks of the subgraph to the node having the number of idle logical CPUs greater than the number of computing tasks of the subgraph, and the idle memory greater than or equal to the memory required to load the metadata of the subgraph, to compute the subgraph, dequeue the queue head element, and continue to execute the adapting.

In some alternative implementations of the present embodiment, the adapting subunit is further configured to: query, in response to determining no node having the number of idle logical CPUs greater than the number of computing tasks of the subgraph, and the idle memory greater than or equal to the memory required to load the metadata of the subgraph, the node resource state table in descending order of the number of idle logical CPUs, and determine whether a node in the node cluster has the number of idle logical CPUs less than the number of computing tasks of the subgraph, and the idle memory greater than or equal to the memory required to load the metadata of the subgraph, where a descending lower limit of the number of idle logical CPUs is 1; and assign, in response to determining the node having the number of idle logical CPUs less than the number of computing tasks of the subgraph, and the idle memory greater than or equal to the memory required to load the metadata of the subgraph, the computing tasks of the subgraph to the node having the number of idle logical CPUs less than the number of computing tasks of the subgraph, and the idle memory greater than or equal to the memory required to load the metadata of the subgraph, to compute the subgraph, dequeue the queue head element, and continue to execute the adapting.

In some alternative implementations of the present embodiment, the apparatus 500 for assigning a computing task further includes: an updating unit (not shown in the figure) configured to update the resource state of the node in the node cluster in the node resource state table after the node in the node cluster is selected or when the computing tasks of the subgraph are completed.

In some alternative implementations of the present embodiment, the adapting subunit is further configured to: continue to execute the adapting, in response to determining no node having the number of idle logical CPUs less than the number of computing tasks of the subgraph, and the idle memory greater than or equal to the memory required to load the metadata of the subgraph, and after updating the node resource state table.

Figure 6:
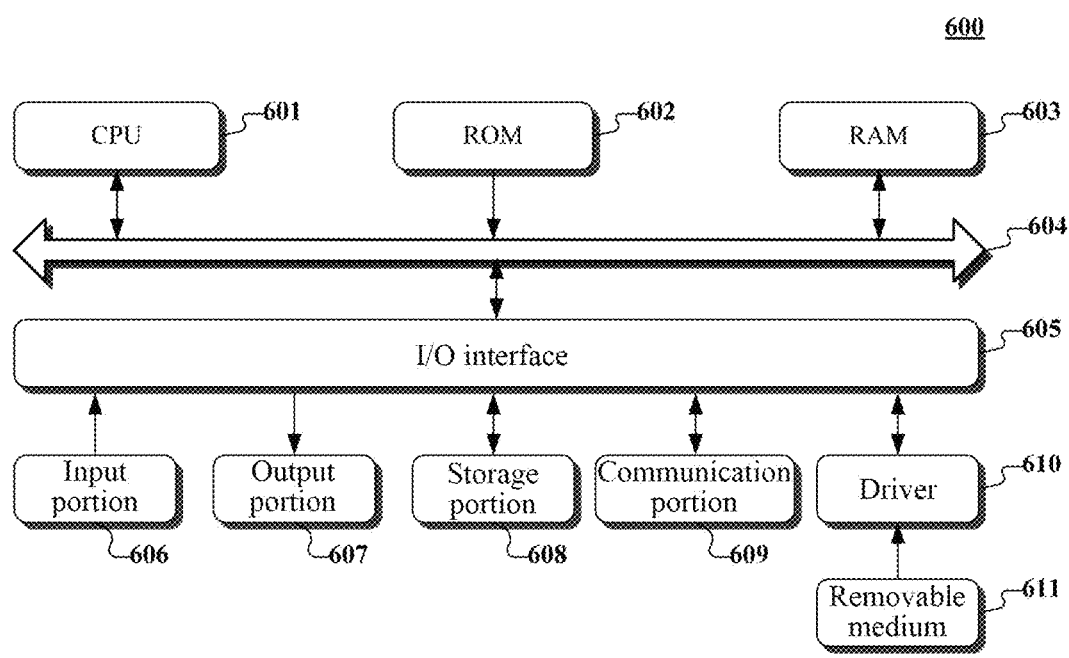
FIG. 6 is a schematic structural diagram of a computer system adapted to implement a server of embodiments of the present disclosure.

Referring to FIG. 6 below, a schematic structural diagram of a computer system 600 adapted to implement a server (e.g., the server 101 in FIG. 1) of embodiments of the present disclosure is shown. The server shown in FIG. 6 is merely an example, and should not limit the functions and scope of use of some embodiments of the present disclosure.

As shown in FIG. 6, the computer system 600 includes a central processing unit (CPU) 601, which may execute various appropriate actions and processes in accordance with a program stored in a read only memory (ROM) 602 or a program loaded into a random access memory (RAM) 603 from a storage portion 608. The RAM 603 further stores various programs and data required by operations of the system 600. The CPU 601, the ROM 602 and the RAM 603 are connected to each other through a bus 604. An input/output (I/O) interface 605 is also connected to the bus 604.

The following components are connected to the I/O interface 605: an input portion 606 including a keyboard, a mouse, or the like; an output portion 607 including a cathode ray tube (CRT), a liquid crystal display device (LCD), a speaker, or the like; a storage portion 608 including a hard disk, or the like; and a communication portion 609 including a network interface card, such as a LAN card and a modem. The communication portion 609 performs communication processes via a network, such as the Internet. A driver 610 is also connected to the I/O interface 605 as required. A removable medium 611, such as a magnetic disk, an optical disk, a magneto-optical disk, and a semiconductor memory, may be installed on the driver 610 as required, such that a computer program read therefrom is installed on the storage portion 608 as needed.

In particular, according to some embodiments of the present disclosure, the process described above with reference to the flow chart may be implemented in a computer software program. For example, an embodiment of the present disclosure includes a computer program product, which includes a computer program that is tangibly embedded in a computer readable medium. The computer program includes program codes for executing the method illustrated in the flow chart. In such an embodiment, the computer program may be downloaded and installed from a network via the communication portion 609, and/or may be installed from the removable medium 611. The computer program, when executed by the central processing unit (CPU) 601, implements the above functions defined by the methods of some embodiments of the present disclosure. It should be noted that the computer readable medium according to some embodiments of the present disclosure may be a computer readable signal medium or a computer readable storage medium or any combination of the above two. An example of the computer readable medium may include, but is not limited to: electric, magnetic, optical, electromagnetic, infrared, or semiconductor systems, apparatuses, elements, or a combination of any of the above. A more specific example of the computer readable medium may include, but is not limited to: electrical connection with one or more pieces of wire, a portable computer disk, a hard disk, a random access memory (RAM), a read only memory (ROM), an erasable programmable read only memory (EPROM or flash memory), an optical fiber, a portable compact disk read only memory (CD-ROM), an optical memory, a magnetic memory, or any suitable combination of the above. In some embodiments of the present disclosure, the computer readable medium may be any tangible medium containing or storing programs, which may be used by a command execution system, apparatus or element, or incorporated thereto. In some embodiments of the present disclosure, the computer readable signal medium may include a data signal in the base band or propagating as a part of a carrier wave, in which computer readable program codes are carried. The propagating data signal may take various forms, including but not limited to an electromagnetic signal, an optical signal, or any suitable combination of the above. The computer readable signal medium may also be any computer readable medium except for the computer readable storage medium. The computer readable medium is capable of transmitting, propagating or transferring programs for use by, or used in combination with, a command execution system, apparatus or element. The program codes contained on the computer readable medium may be transmitted with any suitable medium, including but not limited to: wireless, wired, optical cable, RF medium, etc., or any suitable combination of the above.

A computer program code for executing operations in some embodiments of the present disclosure may be compiled using one or more programming languages or combinations thereof. The programming languages include object-oriented programming languages, such as Java, Smalltalk or C++, and also include conventional procedural programming languages, such as "C" language or similar programming languages. The program code may be completely executed on a user's computer, partially executed on a user's computer, executed as a separate software package, partially executed on a user's computer and partially executed on a remote computer, or completely executed on a remote computer or server. In a circumstance involving a remote computer, the remote computer may be connected to a user's computer through any network, including local area network (LAN) or wide area network (WAN), or be connected to an external computer (for example, connected through the Internet using an Internet service provider).

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion including one or more executable instructions for implementing specified logical functions. It should be further noted that, in some alternative implementations, the functions denoted by the blocks may also occur in a sequence different from the sequences shown in the figures. For example, any two blocks presented in succession may be executed substantially in parallel, or they may sometimes be executed in a reverse sequence, depending on the functions involved. It should be further noted that each block in the block diagrams and/or flow charts as well as a combination of blocks in the block diagrams and/or flow charts may be implemented using a dedicated hardware-based system executing specified functions or operations, or by a combination of dedicated hardware and computer instructions.

The units involved in some embodiments of the present disclosure may be implemented by software or hardware. The described units may also be provided in a processor, for example, described as: a processor including a segmenting unit, an adapting unit, a computing unit, and a synthesizing unit. The names of the units do not constitute a limitation to such units themselves in some cases. For example, the segmenting unit may be further described as "a unit configured to segment, based on a computing resource required for a computing task of a graph, the graph into a subgraph set."

In another aspect, some embodiments of the present disclosure further provide a computer readable medium. The computer readable medium may be included in the server in the above described embodiments, or a stand-alone computer readable medium without being assembled into the server. The above computer readable medium stores one or more programs. The one or more programs, when executed by the server, cause the server to: segment, based on a computing resource required for a computing task of a graph, the graph into a subgraph set; determine, based on a computing resource required for a computing task of a subgraph in the subgraph set, whether a node in a node cluster is adapted to the subgraph in the subgraph set; assign, in response to determining the node in the node cluster being adapted to the subgraph in the subgraph set, the computing task of the subgraph in the subgraph set to the node adapted to the subgraph in the subgraph set, to compute the subgraph; and synthesize a computing result of the graph based on a computing result of each subgraph in the subgraph set.

The above description only provides explanation of embodiments and the employed technical principles of the present disclosure. As will be appreciated by those skilled in the art, the inventive scope of the present disclosure is not limited to the technical solutions formed by the particular combinations of the above-described technical features. The inventive scope should also cover other technical solutions formed by any combination of the above-described technical features or equivalent features thereof without departing from the concept of the disclosure, for example, technical solutions formed by the above-described features being interchanged with, but not limited to, technical features with similar functions disclosed in the present disclosure.

The invention claimed is:

1. A method for assigning a computing task, comprising:
   segmenting, based on a computing resource required for a computing task of a graph, the graph into a subgraph set;
   determining, based on a computing resource required for a computing task of a subgraph in the subgraph set, whether a node in a node cluster is adapted to the subgraph in the subgraph set, wherein subgraphs in the subgraph set do not have a same vertex or edge with each other, and a number of computing tasks of the subgraph in the subgraph set is less than or equal to a maximum number of logical CPUs corresponding to the node cluster;
   assigning, in response to determining the node in the node cluster being adapted to the subgraph in the subgraph set, the computing task of the subgraph in the subgraph set to the node adapted to the subgraph in the subgraph set, to compute the subgraph; and
   synthesizing a computing result of the graph based on a computing result of each subgraph in the subgraph set.

2. The method according to claim 1, wherein a number of idle logical CPUs of the node adapted to the subgraph in the subgraph set is equal to the number of computing tasks of the subgraph in the subgraph set, and an idle memory of the node adapted to the subgraph in the subgraph set is greater than or equal to a memory required to load metadata of the subgraph in the subgraph set.

3. The method according to claim 2, wherein the determining, based on a computing resource required for a computing task of a subgraph in the subgraph set, whether a node in a node cluster is adapted to the subgraph in the subgraph set comprises:
   enqueuing an identifier of each subgraph in the subgraph set, to generate a subgraph queue;
   executing following adapting: querying, for a subgraph corresponding to a queue head element of the subgraph queue, a node resource state table based on the computing resource required for the computing task of the subgraph, and determining whether a node in the node cluster is adapted to the subgraph, wherein the node resource state table is configured to record a resource state of the node in the node cluster, and the resource state comprises the number of idle logical CPUs and a size of the idle memory; and
   dequeuing the queue head element, in response to determining the node being adapted to the subgraph, and continuing to execute the adapting.

4. The method according to claim 3, wherein the enqueuing an identifier of each subgraph in the subgraph set, to generate a subgraph queue comprises:
   enqueuing identifiers of the subgraphs in the subgraph set successively based on priorities of the computing tasks or the number of computing tasks, to generate the subgraph queue.

5. The method according to claim 3, wherein the method further comprises:
   querying, in response to determining no node in the node cluster being adapted to the subgraph, the node resource state table in ascending order of the number of idle logical CPUs, and determining whether a node in the node cluster has the number of idle logical CPUs greater than the number of computing tasks of the subgraph, and the idle memory greater than or equal to the memory required to load the metadata of the subgraph, wherein an ascending upper limit of the number of idle logical CPUs is the maximum number of logical CPUs corresponding to the node cluster; and
   assigning, in response to determining the node having the number of idle logical CPUs greater than the number of computing tasks of the subgraph, and the idle memory greater than or equal to the memory required to load the metadata of the subgraph, the computing tasks of the subgraph to the node having the number of idle logical CPUs greater than the number of computing tasks of the subgraph, and the idle memory greater than or equal to the memory required to load the metadata of the subgraph, to compute the subgraph, dequeuing the queue head element, and continuing to execute the adapting.

6. The method according to claim 5, wherein the method further comprises:
   querying, in response to determining no node having the number of idle logical CPUs greater than the number of computing tasks of the subgraph, and the idle memory greater than or equal to the memory required to load the metadata of the subgraph, the node resource state table in descending order of the number of idle logical CPUs, and determining whether a node in the node cluster has the number of idle logical CPUs less than the number of computing tasks of the subgraph, and the idle memory greater than or equal to the memory required to load the metadata of the subgraph, wherein a descending lower limit of the number of idle logical CPUs is 1; and
   assigning, in response to determining the node having the number of idle logical CPUs less than the number of computing tasks of the subgraph, and the idle memory greater than or equal to the memory required to load the metadata of the subgraph, the computing tasks of the subgraph to the node having the number of idle logical CPUs less than the number of computing tasks of the subgraph, and the idle memory greater than or equal to the memory required to load the metadata of the subgraph, to compute the subgraph, dequeuing the queue head element, and continuing to execute the adapting.

7. The method according to claim 3, wherein the method further comprises:
   updating the resource state of the node in the node cluster in the node resource state table after the node in the node cluster is selected or when the computing tasks of the subgraph are completed.

8. The method according to claim 7, wherein the method further comprises:
   continuing to execute the adapting, in response to determining no node having the number of idle logical CPUs less than the number of computing tasks of the subgraph, and the idle memory greater than or equal to the memory required to load the metadata of the subgraph, and after updating the node resource state table.

9. An apparatus for assigning a computing task, comprising:
   at least one processor; and
   a memory storing instructions, the instructions when executed by the at least one processor, cause the at least one processor to perform operations, the operations comprising:
   segmenting, based on a computing resource required for a computing task of a graph, the graph into a subgraph set;
   determining, based on a computing resource required for a computing task of a subgraph in the subgraph set, whether a node in a node cluster is adapted to the subgraph in the subgraph set, wherein subgraphs in the subgraph set do not have a same vertex or edge with each other, and a number of computing tasks of the subgraph in the subgraph set is less than or equal to a maximum number of logical CPUs corresponding to the node cluster;

assigning, in response to determining the node in the node cluster being adapted to the subgraph in the subgraph set, the computing task of the subgraph in the subgraph set to the node adapted to the subgraph in the subgraph set, to compute the subgraph; and synthesizing a computing result of the graph based on a computing result of each subgraph in the subgraph set.

10. The apparatus according to claim 9, wherein a number of idle logical CPUs of the node adapted to the subgraph in the subgraph set is equal to the number of computing tasks of the subgraph in the subgraph set, and an idle memory of the node adapted to the subgraph in the subgraph set is greater than or equal to a memory required to load metadata of the subgraph in the subgraph set.

11. The apparatus according to claim 10, wherein the determining, based on a computing resource required for a computing task of a subgraph in the subgraph set, whether a node in a node cluster is adapted to the subgraph in the subgraph set comprises:

enqueuing an identifier of each subgraph in the subgraph set, to generate a subgraph queue;

executing following adapting: querying, for a subgraph corresponding to a queue head element of the subgraph queue, a node resource state table based on the computing resource required for the computing task of the subgraph, and determining whether a node in the node cluster is adapted to the subgraph, wherein the node resource state table is configured to record a resource state of the node in the node cluster, and the resource state comprises the number of idle logical CPUs and a size of the idle memory; and dequeuing the queue head element, in response to determining the node being adapted to the subgraph, and continuing to execute the adapting.

12. The apparatus according to claim 11, wherein the enqueuing an identifier of each subgraph in the subgraph set, to generate a subgraph queue comprises:

enqueuing identifiers of the subgraphs in the subgraph set successively based on priorities of the computing tasks or the number of computing tasks, to generate the subgraph queue.

13. The apparatus according to claim 11, wherein the operations further comprise:

querying, in response to determining no node in the node cluster being adapted to the subgraph, the node resource state table in ascending order of the number of idle logical CPUs, and determine whether a node in the node cluster has the number of idle logical CPUs greater than the number of computing tasks of the subgraph, and the idle memory greater than or equal to the memory required to load the metadata of the subgraph, wherein an ascending upper limit of the number of idle logical CPUs is the maximum number of logical CPUs corresponding to the node cluster; and assigning, in response to determining the node having the number of idle logical CPUs greater than the number of computing tasks of the subgraph, and the idle memory greater than or equal to the memory required to load the metadata of the subgraph, the computing tasks of the subgraph to the node having the number of idle logical CPUs greater than the number of computing tasks of the subgraph, and the idle memory greater than or equal to the memory required to load the metadata of the subgraph, to compute the subgraph, dequeuing the queue head element, and continuing to execute the adapting.

14. The apparatus according to claim 13, wherein the operations further comprise:

querying, in response to determining no node having the number of idle logical CPUs greater than the number of computing tasks of the subgraph, and the idle memory greater than or equal to the memory required to load the metadata of the subgraph, the node resource state table in descending order of the number of idle logical CPUs, and determine whether a node in the node cluster has the number of idle logical CPUs less than the number of computing tasks of the subgraph, and the idle memory greater than or equal to the memory required to load the metadata of the subgraph, wherein a descending lower limit of the number of idle logical CPUs is 1; and assigning, in response to determining the node having the number of idle logical CPUs less than the number of computing tasks of the subgraph, and the idle memory greater than or equal to the memory required to load the metadata of the subgraph, the computing tasks of the subgraph to the node having the number of idle logical CPUs less than the number of computing tasks of the subgraph, and the idle memory greater than or equal to the memory required to load the metadata of the subgraph, to compute the subgraph, dequeuing the queue head element, and continuing to execute the adapting.

15. The apparatus according to claim 14, wherein the operations further comprise:

updating the resource state of the node in the node cluster in the node resource state table after the node in the node cluster is selected or when the computing tasks of the subgraph are completed.

16. The apparatus according to claim 15, wherein the operations further comprise:

continuing to execute the adapting, in response to determining no node having the number of idle logical CPUs less than the number of computing tasks of the subgraph, and the idle memory greater than or equal to the memory required to load the metadata of the subgraph, and after updating the node resource state table.

17. A non-transitory computer readable medium, storing a computer program thereon, wherein the computer program, when executed by a processor, causes the processor to perform operations, the operations comprising:

segmenting, based on a computing resource required for a computing task of a graph, the graph into a subgraph set;

determining, based on a computing resource required for a computing task of a subgraph in the subgraph set, whether a node in a node cluster is adapted to the subgraph in the subgraph set, wherein subgraphs in the subgraph set do not have a same vertex or edge with each other, and a number of computing tasks of the subgraph in the subgraph set is less than or equal to a maximum number of logical CPUs corresponding to the node cluster;

assigning, in response to determining the node in the node cluster being adapted to the subgraph in the subgraph set, the computing task of the subgraph in the subgraph set to the node adapted to the subgraph in the subgraph set, to compute the subgraph; and synthesizing a computing result of the graph based on a computing result of each subgraph in the subgraph set.

* * * * *